United States Patent [19]
Grochmal

[11] Patent Number: 5,210,741
[45] Date of Patent: May 11, 1993

[54] LOW COST ISDN SWITCH

[75] Inventor: Robert J. Grochmal, Derry, N.H.

[73] Assignee: Digital Equipment Corporation, Maynard, Mass.

[21] Appl. No.: 546,420

[22] Filed: Jun. 29, 1990

[51] Int. Cl.$^5$ .................... H04L 12/56; H04Q 11/04
[52] U.S. Cl. .................................. 370/56; 370/67; 370/94.1
[58] Field of Search .............. 370/60, 60.1, 85.8, 370/85.7, 85.1, 94.1, 94.2, 95.1, 110.1, 58.1, 58.2, 58.3, 56, 112, 95.2, 67; 340/825.03, 825.06, 825.08, 825.54

[56] References Cited

U.S. PATENT DOCUMENTS 4,726,017  2/1988  Krum et al. .................... 370/85.9

Primary Examiner—Douglas W. Olms
Assistant Examiner—Wellington Chin
Attorney, Agent, or Firm—Kenyon & Kenyon

[57] ABSTRACT

A switch for selecting, from among a plurality of devices, a device to be coupled to a data line, such as an ISDN line. The switch includes a data line receiver coupled to a data line interrogator and switch controller. The switch further includes a device identifier coupled to both the data line receiver and the data line interrogator and switch controller, and a plurality of buffers which can be enabled by the device identifier, thus coupling a device, connected to one of such buffers, with the data line, also connected to such buffers. Information received by the data line receiver is passed to the data line interrogator and switch controller for evaluation to determine whether such information is device identification information. If such information is device identification information, the device interrogator and switch controller signals the device identifier to examine the data and enable the appropriate buffer associated with the device identified by such information so that the identified device can be operatively coupled to the data line. The switch also provides the required control logic to enable a device to be coupled to the data line for transmission of information thereon.

42 Claims, 4 Drawing Sheets

LOW COST ISDN SWITCH

FIELD OF THE INVENTION

This invention relates generally to the field of Integrated Services Digital Networks (ISDN) and, more particularly, to a method and apparatus for providing a low cost ISDN switch interface using standard commercial off-the-shelf components and existing ISDN chips.

BACKGROUND OF THE INVENTION

ISDN is a series of standards, defined by the International Telegraph and Telephone Consultative Committee (CCITT), which specify a network for offering digital communication services. These standards are found in the I, Q and X series of recommendations made by the CCITT.

A standard ISDN user-network interface is shown in FIG. 1 and comprises a local switch 2 (LS) and a network termination unit 4 (NT) which terminates a digital subscriber line 5 extended from the local switch 2. The network termination unit 4 is typically installed at a user's premises. A plurality of ISDN compatible devices 6 are coupled through corresponding plugs 8 to a local passive bus (PB) of metallic cable extending from the network termination unit 4. Two wires of the passive bus PB are used for signal transmission in the direction from the network termination unit 4 towards the ISDN devices 6 and the remaining two wires are used for signal transmission in the direction from the ISDN devices 6 towards the network termination unit 4.

The use of this type of ISDN technology provides an advancement in world-wide telecommunications by offering a new method for integrating voice and data information onto a single telephone line. ISDN's major feature is the ability to provide true point-to-point digital connectivity for transferring data and voice simultaneously. Using ISDN, several applications can be tied to the same line. These applications may include standard telephone, facsimile, computer, data conferencing, electronic and voice mail, to mention just a few.

Presently, there are several types of ISDN lines and protocols. A first type, known as a primary rate interface (PRI), offers, on a single ISDN line, twenty-three (23) data lines (called B lines or channels) and one administration line (called a D line or channel). The D Channel is used for signalling and data communications while the B Channels can be used for either digitally encoded voice or data communications. Another type of ISDN line is known as the basic rate interface (BRI) and is used to couple telephones, terminals, PCs and other desktop devices to higher order equipment and to the ISDN network. The BRI includes two B Channels and one D Channel (the B and D Channels are as described above). In both BRI and PRI, the B Channels operate at 64 kilo-bits per second (kbps), while the D Channel baud rates may vary depending upon the service, i.e., BRI or PRI.

Presently, however, ISDN is an emerging technology and, therefore, the necessary communication links for supporting ISDN compatibility are being targeted for large businesses. Generally, only these large enterprises have the ability to invest the time and money into developing ISDN implementations in their work place.

The targeting of large businesses for ISDN capability by the ISDN service providers generally omits the small to medium size businesses and consumers which are unable to obtain ISDN services in a cost efficient manner.

SUMMARY OF THE INVENTION

The present invention allows a user or business to economically and efficiently use an ISDN line. The invention provides an ISDN switch interface comprised of standard commercial off-the-shelf components to provide multiplexing of incoming ISDN, PRI or BRI B Channels to terminal equipment having ISDN capability, e.g., facsimile machine, PCs, answering machines, telephones, etc.

The present invention provides a low cost ISDN switch interface using existing ISDN chips. In order to achieve minimal cost and desireable flexibility, the present invention uses commercial off-the-shelf ISDN interface chips and a D Channel Interrogator and Switch Controller, such as a finite state machine, to interrogate incoming D Channel information.

The present invention uses a Device Identifier, such as a content addressable memory, to allow for very fast decision making and multiplexing of the B Channel information transmitted between the ISDN source and the present invention. In one embodiment of the present invention, the multiplexing of the B Channel information is done in parallel with the D Channel interrogation by the D Channel Interrogator and Switch Controller.

The present invention can use an electrically erasable programmable read only memory (EEPROM) to store destination address information, such as telephone numbers, etc., which can then be altered, deleted or added as the destination addresses change. Further, in the event of a power failure, the content addressable memories can be reloaded from the EEPROM via a microprocessor which is optionally interfaced to the unique ISDN switch as necessary.

BRIEF DESCRIPTION OF THE DRAWINGS

FIG. 2A depicts a 8:3 priority encoder coupling ISDN compatible devices to a Finite State Machine.

DETAILED DESCRIPTION

Figure 1:
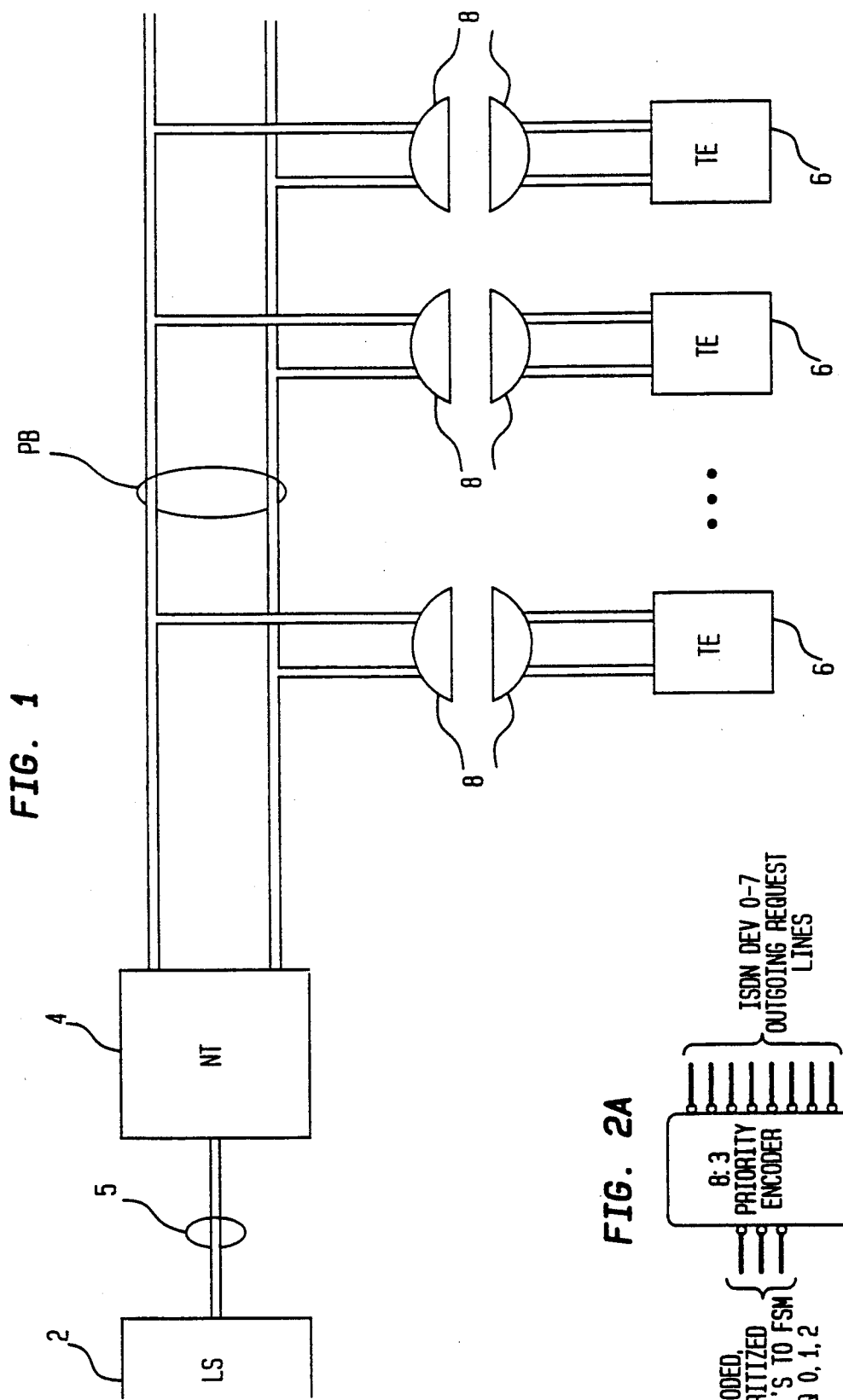
FIG. 1 is a block diagram of an ISDN user-network interface defined according to the CCITT recommendation.
Figure 2:
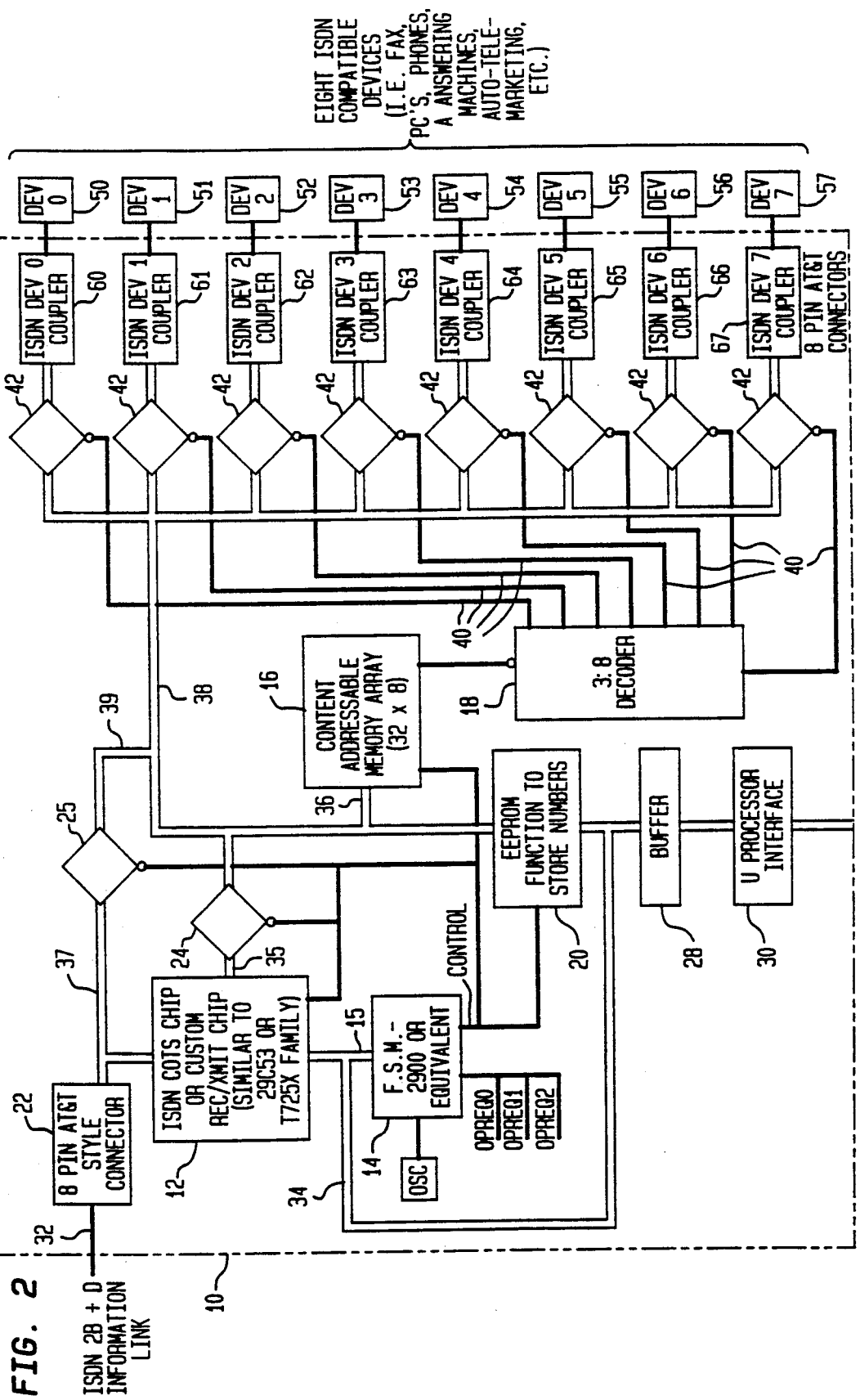
FIG. 2 is a block diagram of the ISDN switch of the present invention.

Referring to FIG. 2, the ISDN switch interface 10 of the present invention is shown having a plurality of devices 50–57 coupled thereto. In the embodiment shown, eight devices 50–57 designated as DEV 0 through DEV 7 are coupled to the switch interface 10 via standard eight-pin connectors 60–67. Any number of devices could be coupled to the switch 10 depending upon consumer requirements; eight are depicted in the exemplary embodiment of FIG. 2.

An ISDN line 32 provides incoming information to the switch interface 10. For this example, the ISDN line 32 is of the BRI type having two B Channels and one D Channel. The line 32 is coupled with the switch interface 10 through an 8-pin connector 22. This connector may be of the plug type manufactured by AT&T as the standard 8-pin coupling module. Therefore, the ISDN line 32 can be plugged into the switch interface 10 using the connector 22.

The information from the ISDN line 32 is provided to an ISDN commercial off-the-shelf (COTS) ISDN interface chip 12. The D Channel is an administrative channel which transmits information such as the destination and the type of data on the line. The ISDN interface chip 12 may be similar to a model 29C53 or may be from the T725X family of commercial components and must allow the switch interface's finite state machine 14 to have access to information identifying a target device (DEV 0-DEV 7).

The information from the ISDN line 32 is provided as an output from the ISDN interface chip 12 over bus 35 to buffer 24. The buffer 24, under the control of a D Channel Interrogator and Switch Controller, such as a finite state machine 14, receives the information and provides the information as an output over bus 38 to a plurality of buffers 42 which are associated with various devices 50-57. When operating to transfer information from a device 50-57 to the ISDN line 32, the switch interface 10 uses a buffer 25, connected to the device by buses 38, 39, to pass such information to the ISDN line 32. The information on bus 38 is fed in parallel form to and from a plurality of buffers 42, each associated with a device, DEV 0-DEV 7.

The D Channel signal information is provided from the ISDN interface chip 12 to a finite state machine 14 D Channel Interrogator and Switch Controller over a bus 15. The finite state machine 14 (which may be a microsequencer) examines the D Channel information received over the bus 15. As with the ISDN interface chip 12, the finite state machine chip 14 may be any readily available commercial component such as the state machine found in the 2900 LSI family.

The finite state machine 14 is programmed to intelligently recognize different types of D Channel signal information and to, at the appropriate moment, signal its recognition of such information (which may identify target devices, 50-57) to the Device Identifier, such as a content addressable memory 16. The finite state machine 14 operates according to the state diagram provided in FIG. 3.

Figure 3:
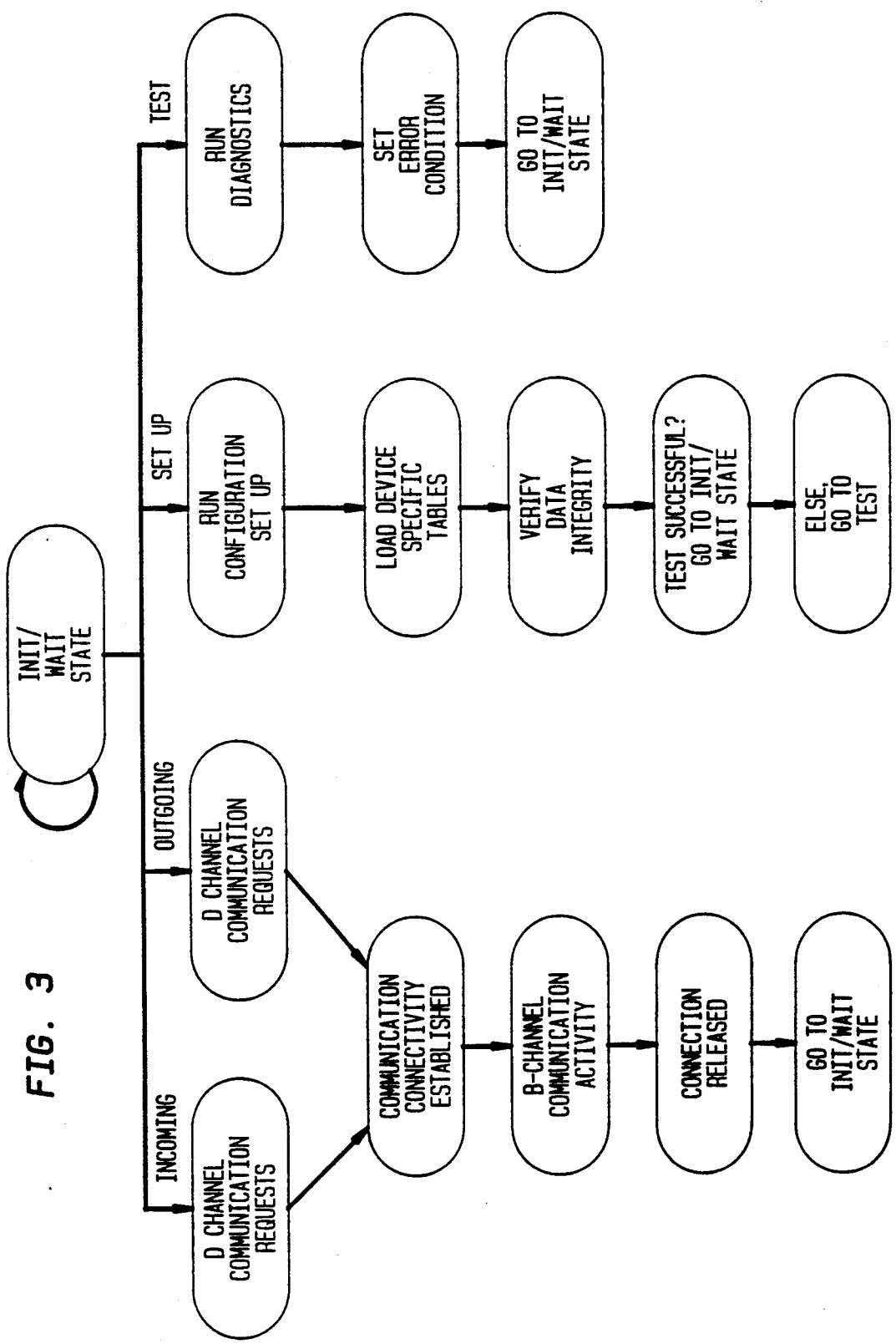
FIG. 3 is a state table for a finite state machine used as a D Channel Interrogator and Switch Controller in the present invention.

FIG. 3 depicts the states of the finite state machine 14. Macro states associated with the machine include an Init/Wait state, which is the macro state indicating that no communication or other activity is taking place; an Incoming state, which is the macro state the machine is in when information is being sent to switch interface 10 from the ISDN line 32; an Outgoing state, which is the macro state the machine is in when information is to be sent from a device 50-57 out through the switch interface 10 to the ISDN line 32; a Set Up state, which is the macro state the machine is in when power is first being applied to the switch interface 10 (for example, at the beginning of a business day or after an unexpected power-down cycle); and a Test state, which is the macro state the machine is in when performing diagnostic procedures.

During routine operation of the switch interface 10, only the Init/Wait, Incoming and Outgoing macro states are involved. The Incoming macro state, and its subsidiary states, as indicated in FIG. 3, concern those functions of receiving and screening information received from the ISDN line 32, establishing a communication pathway between the line 32 and a target device identified by information received and screened, and releasing such communication pathway at the termination of communications. Upon such release, the finite state machine returns to the Init/Wait state.

The Outgoing macro state, and its subsidiary states, concern the receipt of a request from a device 50-57 to communicate over the ISDN line 32. As is the case with the Incoming macro state, subsidiary states concern establishing a communication pathway, communicating over such pathway, releasing such pathway at the end of communications, and a return to the Init/Wait macro state.

The Set Up macro state, and its subsidiary states, concern the initialization, or "set up," of switch interface 10 (for example, at the beginning of a business day or, after an unexpected power-down cycle). The states associated with this macro state include a test of associated hardware, the loading of target device specific tables, a verification of loaded data and, if such verification is unsuccessful, the execution of a test sequence (if such verification is successful, the finite state machine returns to the Init/Wait state).

The Test macro state, and its subsidiary states, concern the execution of diagnostic procedures and notification of errors discovered thereby.

Figure 4:
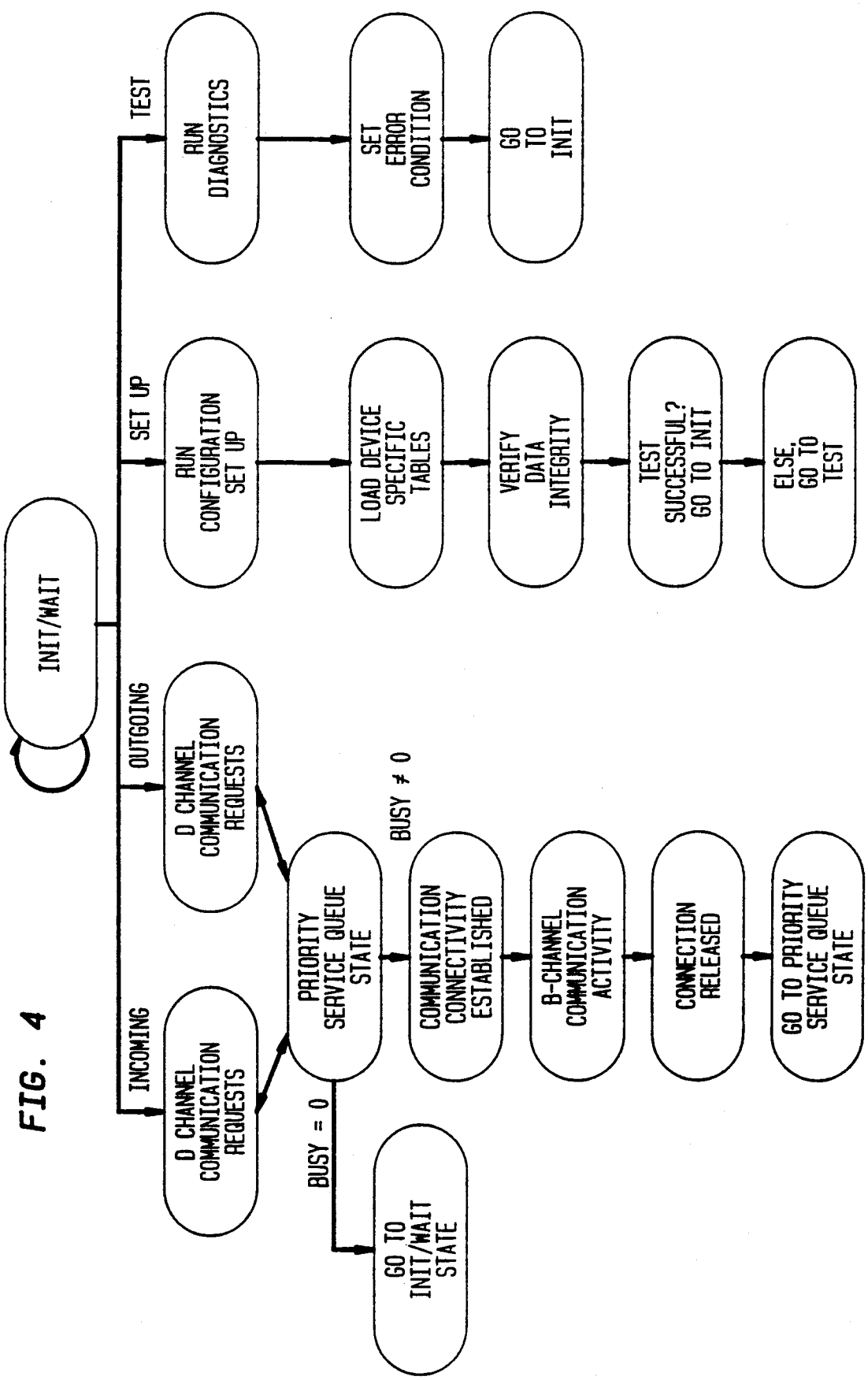
FIG. 4 is a state table for a finite state machine used as a D Channel Interrogator and Switch Controller, including a state for queuing device transmission requests.

FIG. 4 depicts a variation on FIG. 3 wherein outgoing D Channel communication requests can be stored in a queue, whereby upon the release of a communication pathway after an incoming or outgoing transmission over the ISDN line 32, requests for access to the ISDN line 32, which occurred during the transmission just ended, can be serviced in a fast and efficient manner. One embodiment of the queue would involve a small amount of memory for storing the identification of requesting devices and, if desired, an arbitration or priority scheme for selecting among those devices with requests in the queue. Note that the total number of requests, BUSY, can be indicated and maintained by the memory (if BUSY=0, no requests in the queue; if BUSY$\neq$0, then there are BUSY requests in the queue).

A content addressable memory (CAM) 16 is also provided in the switch interface 10 and receives information from the ISDN interface chip 12 over bus 36. The CAM 16 is loaded with information identifying each of the devices 50-57 coupled to the switch 10. In this example, a 32×8 bit CAM is shown such that each of the eight devices can have an identifying code of up to 32 bits. The output from CAM 16 is an address which is provided to a decoder 18. In this example, the eight addresses of the CAM 16 are represented by a three bit address which is provided to the 3:8 decoder 18. The decoder 18 has an output line 40 coupled to each of the buffers 42 associated with each of the devices 50-57. These output lines 40 enable the buffers 42 to switch the data provided from bus 38 to their respective ISDN device (DEV 0-DEV 7; 50-57, respectively).

The capacity of the switch interface 10 to select from a greater or smaller number of target devices can be varied according to the needs of specific applications. For example, larger or smaller CAMs could be employed, or, more than one CAM could be used. If multiple CAMs are used, they can be connected to the bus 36 and the control signal from the finite state machine 14 in parallel, each CAM driving an individual decoder for enabling a set of buffers.

The switch interface 10 further includes an electrically erasable programmable read only memory (EE- PROM) 20 coupled to the CAM 16. The EEPROM 20 stores the proper initialization parameters for the CAM 16 in case of a power failure. The EEPROM 20 further allows the operator to change the number or configuration of the supported devices 50–57.

The switch interface 10 may further be coupled to a microprocessor (not shown) via a microprocessor interface 30 and buffer 28. The microprocessor interface 30 is a commercially available ISDN transceiver chip. As is shown in FIG. 3, the microprocessor interface 30 is coupled, via buffer 28, to EEPROM 20, finite state machine 14 and ISDN chip 12 (via bus 34), and the CAM 16, via EEPROM 20 and bus 36. These couplings allow for microprocessor-based debug and test of the various devices so coupled to the microprocessor (not shown). Moreover, the microprocessor can serve as the source of switch interface 10 initialization data for loading in, for example, the EEPROM.

The buffer 28 coupling the microprocessor interface 30 with the remainder of the ISDN switch 10 functions to provide, for example, electrical isolation between the switch interface logic from the microprocessor.

The finite state machine 14 includes control logic for operating the switch interface 10 components. The control logic operates the switch interface 10 in accordance with the state diagrams of FIGS. 3 or 4 discussed above.

In an example of the operation of the low cost ISDN switch interface 10, each ISDN compatible device 50–57 is identified by a telephone number including its city or area code and country code. (Depending on the ISDN standard, a target device may be identified by a telephone number, a telephone number plus other bits, or some other sequence of bits. For purposes of this example, a device is identified by a telephone number, including relevant supporting codes such as country, area or city codes. Other identification schemes may be employed as well, depending upon the requirements of ISDN). This information is loaded into the CAM 16 with each address in the CAM corresponding to a device connector 60–67 location. For example, the coupling plug for ISDN DEV 0 will have the identifying information stored in address 0 of the memory 16, DEV 1 has its identifying code stored in memory location 1, and so on.

When incoming signal information is provided from the ISDN line 32, the ISDN interface chip 12 receives the information and provides it to the finite state machine 14. Once the finite state machine 14 has looked at the data on the D Channel and recognized it as device identification information according to an ISDN specification (here taken to be a telephone number plus related codes), enabling signals are sent to the CAM 16 and the buffer 24. The necessary information is passed through the buffer 24 to the buffers 42 for each of the devices 50–57. At this point, none of the buffers is enabled and the data is simply available at the input to each buffer. The necessary information is provided over bus 36 to the content addressable memory 16. The information on bus 36 is then compared by the CAM 16 with the contents of the address locations in the CAM 16. When a match is found, a 3-bit address for that match is provided as an output to the 3:8 decoder 18. The decoder 18 then enables one of its signal lines 40 corresponding to the 3-bit address received from the CAM 16. By enabling a signal line 40, one of the buffers 42 is enabled and the necessary information is switched through the ISDN coupler 60–67 to the ISDN compatible device 50–57. In this manner, the proper device is switched onto the ISDN incoming line 32 and communications can then be established. The use of the switch interface 10 avoids the need for having dedicated B Channels for a particular ISDN compatible device. Thus, businesses which cannot maintain several ISDN lines economically can still make use of ISDN services by effectively, adaptively multiplexing the ISDN line with their ISDN compatible devices.

Should any device 50–57 desire to transmit information over the ISDN line 32, it must first signal its intention to the finite state machine 14. Each such device 50–57 is connected to an 8:3 priority encoder (see FIG. 2A) which can select from among one or more devices and provide a three bit code identifying the selected device. The three bit code of the selected device is provided on lines OPREQ 0, OPREQ 1 and OPREQ 2, which are connected to the finite state machine 14. In response to a three bit code from the 8:3 priority encoder, the finite state machine can provide control information to the CAM 16 allowing for the enabling of the appropriate buffer 42 and can enable buffer 25 allowing the selected device access to the ISDN information line 32.

In addition to encoding requests from devices 50–57, the 8:3 priority encoder can function to select, via a built in priority scheme, from among two or more devices 50–57 simultaneously requesting to transmit over ISDN line 32. Each device 50–57 is assigned a unique priority which is used by the 8:3 priority encoder to select from among simultaneous requests from devices 50-57.

What is claimed is:

1. A switch for selecting, from among a plurality of devices, a device to be coupled to a data line, said switch comprising:
    a data line receiver, for coupling to a data line;
    a data line interrogator and switch controller, coupled to the data line receiver;
    a device identifier, coupled to the data line receiver and the data line interrogator and switch controller, the device identifier including a content addressable memory containing device information; and
    a plurality of buffers, each buffer having an enabling input coupled to the device identifier, each buffer being coupled to the data line, and each buffer for coupling to a device;
such that when information is received by the data line receiver and evaluated by the data line interrogator and switch controller to be device identification information, the data line interrogator and switch controller signals the device identifier to utilize the content addressable memory to identify a device from the device identification information, the device identifier enabling a buffer associated with the identified device to provide for an operative coupling of the data line and the identified device.

2. A switch as recited in claim 1, wherein the data line interrogator and switch controller comprises a finite state machine.

3. A switch as recited in claim 1, wherein the coupling of the enabling input of each buffer with the device identifier comprises a decoder.

4. A switch as recited in claim 1 further comprising a memory containing initialization parameters for the device identifier.

5. A switch according to claim 4, wherein the memory comprises EEPROM.

6. A switch according to claim 4, wherein the memory of said switch is coupled to a microprocessor, to provide initialization parameters to the memory.

7. A switch according to claim 1 wherein the data line is an ISDN line.

8. A switch as recited in claim 1, wherein said data line receiver is a commercially available chip.

9. A switch as recited in claim 1, wherein said coupling of the device identifier to the data line receiver is via the data line interrogator and switch controller.

10. A switch as recited in claim 1, wherein a device to be coupled to the data line is an ISDN compatible device.

11. A switch as recited in claim 1, further comprising:
a second plurality of buffers, each buffer having an enabling input, and each being coupled to the data line and each for coupling to a device; and
a second device identifier, coupled to the data line receiver, the data line interrogator and switch controller, and the second plurality of buffers;
such that when information is evaluated by the data line interrogator and switch controller to be device identification information, the data line interrogator and switch controller signals both the device identifier and the second device identifier, one of said device identifiers responding by enabling a buffer associated with a device identified by the device identification information to provide for an operative coupling of the data line and the identified device.

12. A switch as recited in claim 11, wherein the second device identifier comprises a second content addressable memory.

13. A switch as recited in claim 1, further comprising:
a second plurality of buffers, each buffer having an enabling input, and each being coupled to the data line and each for coupling to a device;
a second device identifier, coupled to the data line interrogator and switch controller, the data line receiver via the data line interrogator and switch controller, and the second plurality of buffers;
such that when information is evaluated by the data line interrogator and switch controller to be device identification information, the data line interrogator and switch controller signals both the device identifier and the second device identifier, one of said device identifiers responding by enabling a buffer associated with a device identified by the device identification information to provide for an operative coupling of the data line and the identified device.

14. A switch as recited in claim 13, wherein the second device identifier comprises a second content addressable memory.

15. A switch as recited in claim 1, further comprising an eight pin connector for coupling the data line receiver to the data line.

16. A switch as recited in claim 1, further comprising a plurality of eight-pin connectors for coupling the plurality of buffers to the corresponding plurality of devices.

17. A method of selecting, from a plurality of devices, a device for coupling to a data line, comprising the steps of:
receiving information from the data line;
examining the information to determine the presence of device identifier information; and
utilizing a content addressable memory to identify a device from the device identifier information; and
enabling a buffer, associated with the identified device, such that said buffer provides an operative coupling of the identified device with the data line.

18. A method as recited in claim 17, further comprising the step of:
generating a code as a function of device identifier information; and
said step of enabling a buffer comprising decoding said code to thereby energize an enable line coupled to a buffer associated with said device identifier information.

19. A switch for selecting one of a plurality of devices for coupling to a data line, said switch comprising:
a switch controller, for coupling to each of a plurality of devices;
a device selector, coupled to the switch controller, the device selector including a content addressable memory containing device information; and
a plurality of buffers, each of said buffers having an enabling input coupled to the device selector, each buffer coupled to the data line and each buffer for coupling to a device;
such that when a device coupled to the switch controller signals a desire to be coupled to the data line, the switch controller signals to the device selector to utilize the content addressable memory to identify the device, the device selector sending an enable signal to the buffer associated with the identified device to be coupled to the data line, thereby operatively coupling the data line to said identified device.

20. A switch as recited in claim 19, wherein the switch controller comprises a finite state machine.

21. A switch as recited in claim 19, wherein the coupling of the switch controller to each of the plurality of devices comprises an encoder.

22. A switch as recited in claim 21, wherein said encoder selects from among two or more devices desiring to be coupled to the data line according to a priority scheme.

23. A switch as recited in to claim 19, wherein the data line is an ISDN line.

24. A switch as recited in claim 19, wherein a device to be coupled to the data line is an ISDN compatible device.

25. A switch as recited in claim 19, wherein said switch controller comprises a queue for storing requests to said switch controller from one or more devices desiring to be coupled to the data line.

26. A method for selecting one of a plurality of devices for coupling to a data line, the method comprising the steps of:
signaling from a device to a switch controller the device's desire to be coupled to the data line;
signaling from the switch controller to a device selector, which includes a content addressable memory, for said device selector to utilize said content addressable memory for identifying said device, and to send an enable signal to a buffer coupled to said identified device; and
enabling said buffer to operatively couple said identified device to said data line.

27. A method as recited in claim 26, wherein the step of signaling the device's desire to be coupled to a data line comprises encoding said device's signal.

28. A method as recited in claim 27, wherein encoding is performed according to a priority scheme.

29. A method as recited in claim 26, wherein the data line is an ISDN line.

30. A method as recited in claim 26, wherein a device to be coupled to the data line is an ISDN compatible device.

31. A switch for selecting, from among a plurality of devices, a device to be coupled to a data line, said switch comprising:
- a data line receiver, for coupling to a data line;
- a data line interrogator and switch controller, coupled to the data line receiver;
- a device identifier, coupled to the data line receiver and the data line interrogator and switch controller; and
- a plurality of buffers, each buffer having an enabling input coupled to the device identifier, each buffer being coupled to the data line, and each buffer for coupling to a device;

such that when information is received by the data line receiver and evaluated by the data line interrogator and switch controller to be device identification information, the data line interrogator and switch controller signals the device identifier to enable a buffer associated with a device so identified to provide for an operative coupling of the data line and the identified device;
wherein the coupling of each buffer to the data line comprises a first additional buffer having an enabling input, said first additional buffer being coupled to the data line receiver, and said enabling input of said first additional buffer being coupled to the data line interrogator and switch controller.

32. A switch for selecting, from among a plurality of devices, a device to be coupled to a data line, said switch comprising:
- means, coupled to said data line, for receiving information;
- means, coupled to said means for receiving information, for evaluating whether said information comprises device identification information;
- means, coupled to said means for receiving information and said means for evaluating, and including a content addressable memory containing device information, for utilizing the content addressable memory to identify a device associated with said device identification information and generating an enable signal associated with the identified device; and
- a plurality of buffers, each buffer having an enabling input coupled to said means for utilizing and generating, each buffer being coupled to said data line, and each buffer for coupling to a device, whereby when a buffer receives an enable signal from said means for utilizing and generating, said buffer provides an operative coupling of said data line and an identified device.

33. A switch as recited in claim 32, further comprising a means, connected to said means for utilizing and generating, for storing initialization parameters for said means for utilizing and generating.

34. A switch for selecting one of a plurality of devices for coupling to a data line, said switch comprising:
- means, for coupling to each of a plurality of devices, for receiving from a device a request to be coupled to the data line;
- means, coupled to said means for receiving, for generating an enable signal associated with said device, said means for generating including a content addressable memory containing device information; and
- means, said means coupled to the data line and for coupling to a device, and having an enabling input coupled to said means for generating, for receiving said enable signal and, in response thereto, operatively coupling the data line with said device.

35. A switch as recited in claim 34, wherein the means for receiving comprises a finite state machine.

36. A switch as recited in claim 34, wherein the coupling of said means for receiving to each of a plurality of devices comprises a means for encoding.

37. A switch as recited in claim 36, wherein said means for encoding selects from among two or more devices desiring to be coupled to the data line according to a priority scheme.

38. A switch as recited in claim 34, wherein the data line is an ISDN line.

39. A switch as recited in claim 34, wherein a device for coupling to the data line is an ISDN compatible device.

40. A switch as recited in claim 34, wherein said means for receiving comprises means for storing requests from one or more devices desiring to be coupled to the data line.

41. A switch for selecting one of a plurality of devices for coupling to a data line, said switch comprising:
- a switch controller, for coupling to each of a plurality of devices;
- a device selector, coupled to the switch controller; and
- a plurality of buffers, each of said buffers having an enabling input coupled to the device selector, each buffer coupled to the data line and each buffer for coupling to a device;

such that when a device coupled to the switch controller signals a desire to be coupled to the data line, the switch controller signals the device selector to send an enable signal to the buffer associated with the device to be coupled to the data line, thereby operatively coupling the data line to said device;
wherein the coupling of each buffer to the data line includes a first additional buffer having an enabling input coupled to the switch controller.

42. A switch for selecting, from among a plurality of devices, a device to be coupled to a data line, said switch comprising:
- means, coupled to said data line, for receiving information;
- means, coupled to said means for receiving information, for evaluating whether said information comprises device identification information;
- means, coupled to said means for receiving information and said means for evaluating, for identifying a device associated with said device identification information and generating an enable signal associated with the identified device; and
- a plurality of buffers, each buffer having an enabling input coupled to said means for identifying and generating, each buffer being coupled to said data line, and each buffer for coupling to a device, whereby when a buffer receives an enable signal from said means for identifying and generating, said buffer provides an operative coupling of said data line and an identified device, wherein the coupling of each buffer to the data line includes a first additional buffer having an enabling input, said first additional buffer being coupled to said means for receiving, and said enabling input of said first additional buffer being coupled to said means for identifying and generating.

* * * * *